United States Patent [19]
Komsa

[11] B 3,916,165
[45] Oct. 28, 1975

[54] WORK CYCLE MONITOR FOR MACHINE TOOLS AND THE LIKE

[75] Inventor: Sasha Komsa, Washington, Ill.

[73] Assignee: Caterpillar Tractor Co., Peoria, Ill.

[22] Filed: Jan. 12, 1973

[21] Appl. No.: 323,203

[44] Published under the Trial Voluntary Protest Program on January 28, 1975 as document no. B 323,203.

[52] U.S. Cl. ........ 235/92 PD; 235/92 R; 235/92 FP; 235/92 FL
[51] Int. Cl.² ........................................ H03K 21/09
[58] Field of Search ........ 235/92 PD, 92 FD, 92 FL

[56] References Cited
UNITED STATES PATENTS

| | | | |
|---|---|---|---|
| 3,044,699 | 7/1962 | Smith | 235/92 FP |
| 3,329,806 | 7/1967 | McCauley | 235/92 PD |
| 3,467,821 | 9/1969 | Arp | 235/92 PD |
| 3,604,904 | 9/1971 | Stiebel | 235/92 PD |
| 3,729,620 | 4/1973 | Jones | 235/92 FP |

*Primary Examiner*—Gareth D. Shaw
*Assistant Examiner*—Robert F. Gnuse
*Attorney, Agent, or Firm*—Phillips, Moore, Weissenberger Lempio & Strabala

[57] ABSTRACT

Workpiece output at an electrically driven machine tool is counted by a relatively tamper proof means which responds to the electrical power consumption variations characteristic of a work cycle at the machine. The system distinguishes between normal work cycles and incorrect cycles that produce a defective workpiece or which result from attempts to simulate cycling. Workpiece counts may be displayed at a visual readout or may be printed out on a permanent record which may include the time and day of each production.

6 Claims, 3 Drawing Figures

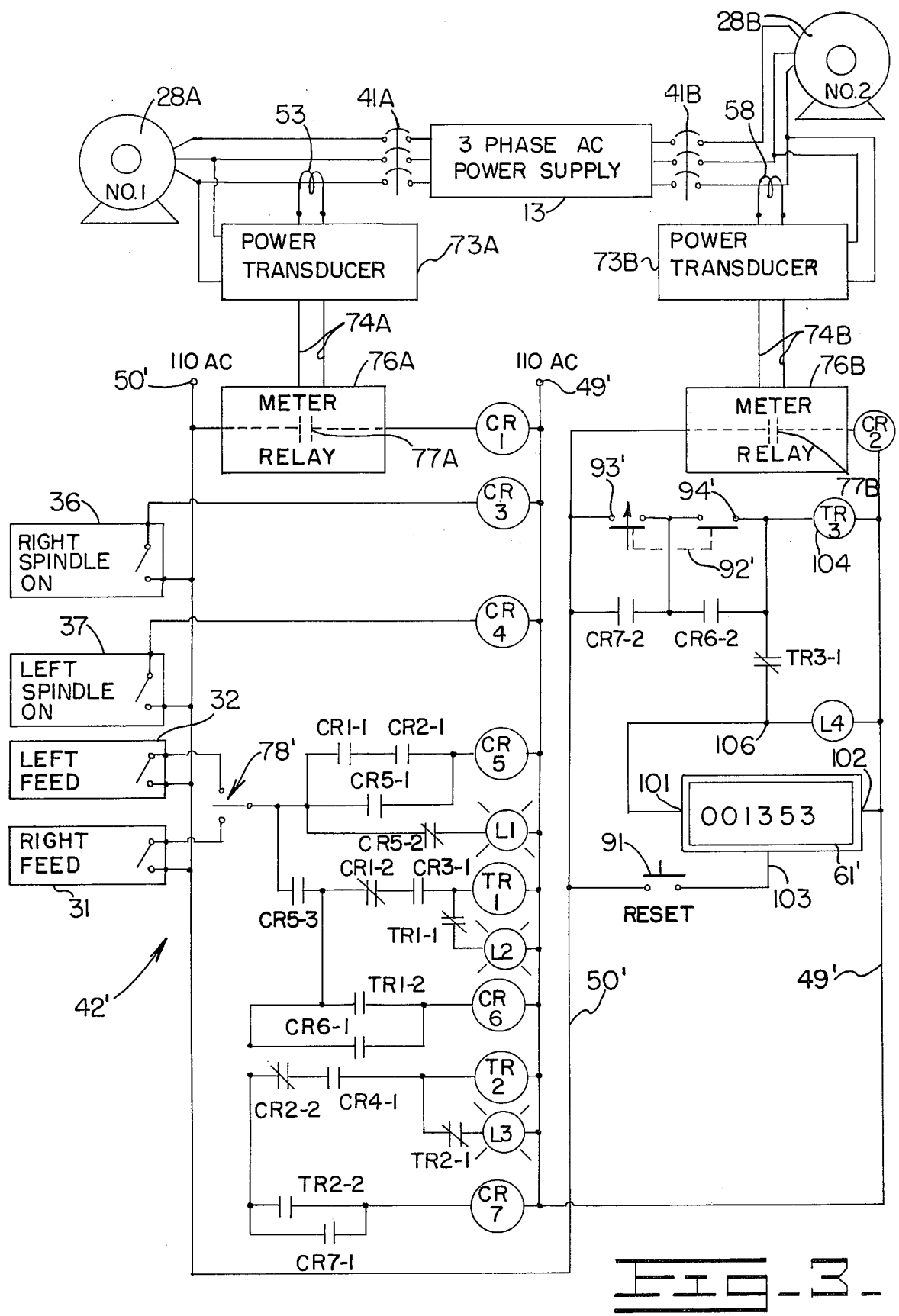
Fig-3-

WORK CYCLE MONITOR FOR MACHINE TOOLS AND THE LIKE

BACKGROUND OF THE INVENTION

This invention relates to systems for monitoring production rate at an electrically driven machine tool or the like.

In factories and other installations where electrically driven machine tools are employed to perform repetitive operations on workpieces, it is often desirable to provide means for counting the workpiece output at each such tool. Instances have occurred where the operators of such tools have been motivated to attempt to falsify the count recorded by such means and thus the system should be designed to make such tampering difficult. This is extremely difficult to do where the workpiece counter operates by sensing some physical movement of the workpiece or machine tool since such movements can generally be simulated by an operator without performing a full and complete work cycle. One form of prior system which avoids this problem functions by detecting changes in the electrical current drawn by the machine tool. As the motor which drives the tool is subjected to heavier loading in the course of a machining operation, the amount of current drawn by the motor rises during the work cycle and this can be detected and caused to actuate a counter. As this does not require sensing of mechanical movement, components of the detection system can be inaccessibly situated on the machine or may even be remote therefrom as the current sensing may be done at a remote point on the conductors which supply electrical power to the machine tool.

As heretofore constructed, workpiece counters of this general type may be subject to some inaccuracy from several sources. In some cases, particularly where relatively light cuts are being made with the machine tool, current changes in the course of a working cycle may not be of sufficiently large magnitude to be reliably distinquished from current changes that arise from other causes. Further, an operator who is aware of the mode of operation of the system may be able to deliberately create a series of brief current surges by repeated applications of the cutting tool to a single workpiece or by other techniques. Still further, prior systems do not in general have the ability to distinguish between a normal work cycle which results in the desired production of an acceptable workpiece and an improper work cycle which may result in a defective workpiece. Under these circumstances the recorded count will include unsatisfactory production as well as a count of the acceptable workpieces. In addition, prior systems do not detect the situation where an operator cycles the machine tool at an abnormally fast rate by making undesirably heavy cuts in order to reach a production quota in less than the normal time. Still another difficulty is that prior systems are not fail safe with respect to indicating when a recorded production count is erroneous because the counting system itself has malfunctioned.

SUMMARY OF THE INVENTION

The present invention provides a work cycle monitor for machine tools and the like which resolves the several deficiencies of the prior art as discussed above. To provide greater sensitivity with respect to distinguishing a work cycle from other occurrances that cause electrical variations, the system responds to changes in true power consumption at a tool rather than to current surges as such. To distinguish between normal work cycles and defective or false cycles, the system responds only to uninterrupted power consumption increases of a predetermined magnitude and duration that is characteristic of a normal work cycle. In a preferred form, the system provides means for indicating if an apparent workcycle count is erroneous due to a failure within the system itself and provides means for printing out the day and time of completion of each individual workpiece in addition to a total count.

Accordingly, it is an object of this invention to provide a more accurate and reliable means for monitoring work output at an electrically driven machine tool or the like.

The invention together with further objects and advantages thereof will best be understood by reference to the following description of preferred embodiments taken in conjunction with the accompanying drawings.

BRIEF DESCRIPTION OF THE DRAWINGS

In the accompanying drawings:

FIG. 3 is a circuit diagram of a simplified second embodiment of the invention which provides a visually displayed accumulated count of workpiece production.

DESCRIPTION OF THE PREFERRED EMBODIMENT

Figure 1:
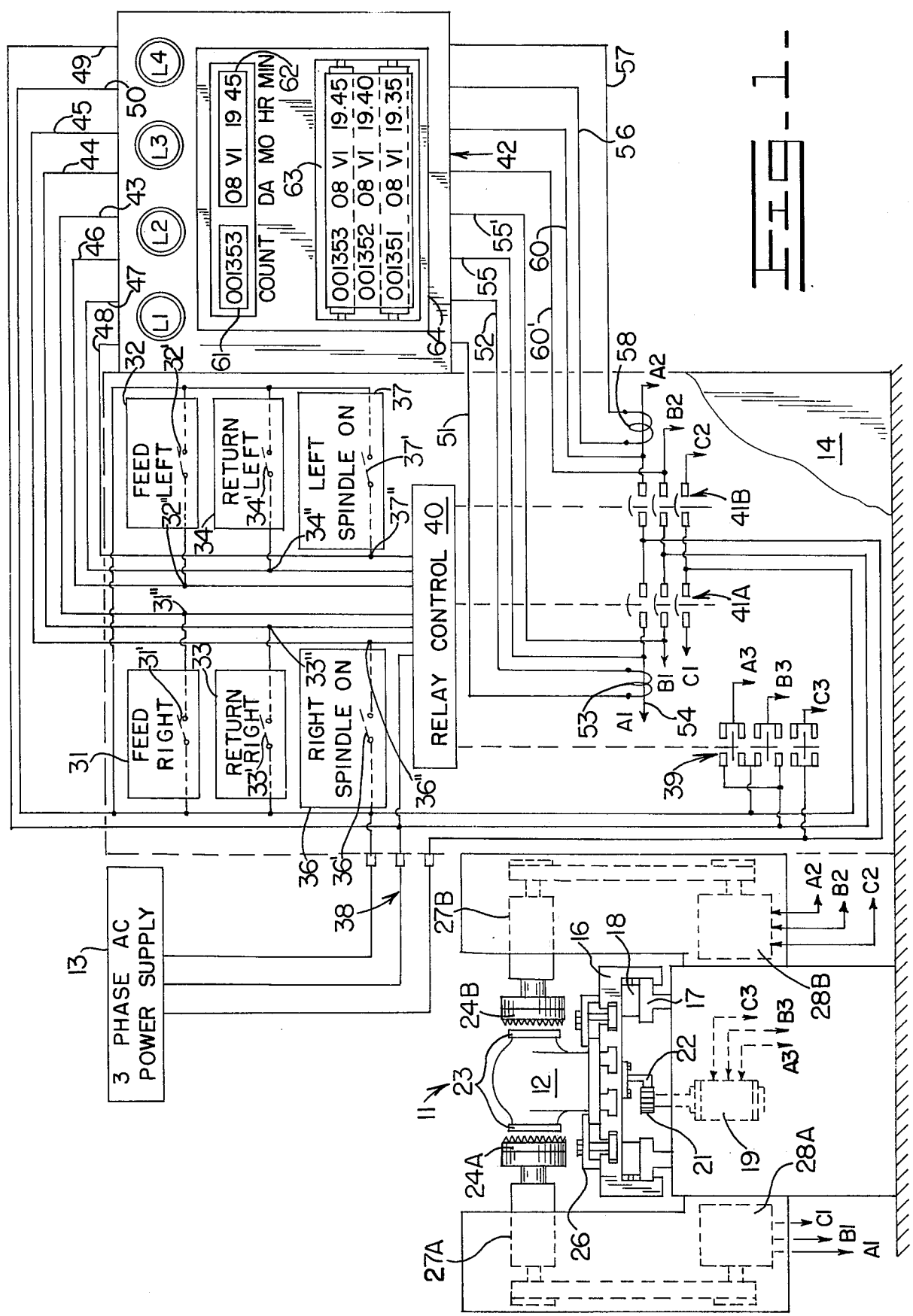
FIG. 1 illustrates a first embodiment of the invention coupled to a typical electrically driven machine tool, the tool being a double spindle milling machine in this example.

Referring initially to FIG. 1 of the drawing, a duplex milling machine 11 is shown as it is typical of the machine tools to which the present invention may be applied for the purpose of counting the number of workpieces 12 which are processed on the machine. The invention is equally applicable to many other forms of machine tool or like devices in which each work cycle is characterized by a variation in the amount of electrical power drawn from a power supply 13. As the milling machine 11, including the machine control console 14, may be of conventional construction, elements of the milling machine and controls will be herein described only to the extent necessary to understand the co-action of the present invention therewith.

A duplex milling machine 11 of this kind may include a work holding table 16 which may be traversed along a pair of guide rails 17 on rollers 18. Motion of the work holding table 16 is produced by a table drive motor 19 driving a gear 21 which engages a rack 22 attached to the table. Motor 19 is of the three phase alternating current reversible form and has power terminals A3, B3 and C3. The workpieces 12 in this example are castings having oppositely facing annular surfaces 23 which are simultaneously milled by opposed rotary cutting heads 24A and 24B of the milling machining as the work holding table 16 traverses the workpiece between the cutting heads, the workpiece being temporarily clamped to the table by clamping means 26.

Cutting heads 24A and 24B are rotatably supported by spindle assemblies 27A and 27B respectively and are driven by three phase electrical spindle motors 28A and 28B respectively which have power terminals A1, B1, C1 and A2, B2, C2 respectively. In the course of a work cycle, work table 16 is initially at a position to one side of the cutting heads 24A and 24B, termed the loading position and workpiece 12 is secured thereon by clamping means 26. Table drive motor 19 is then caused to move the table along rails 17 to pass the workpiece 12 between the cutting heads 24A and 24B. Following the machining operation, table drive motor 19 is reversed to return the workpiece to the original or loading position at which it may be removed and then another workpiece is mounted on the table for a subsequent cycle of operation.

While the motor operations necessary to perform the above described work cycle can be fully manually controlled, it is more customary to provide for semi-automatic machine control through console 14 to sequence the motors in accordance with a program established by the setting of a series of individual function controls 31 to 37. Such controls in this particular machine 11 include a Feed Right control 31 which is activated to cause the work table 16 to move from the above described loading position towards the position at which the workpiece is engaged by cutting heads 24, a Feed Left control 32 which travels the work table in the opposite direction for use in instances where the workpieces are to be mounted on the table at the opposite side of the machine, a Return Right control 33 which programs the machine to return the workpiece to the original loading position at the conclusion of a work cycle, a Return Left control 34 which causes the workpiece to be returned in the opposite direction where loading is done from the opposite side, a Right Spindle On control 36 and a Left Spindle On control 37.

Power supply 13 is a three phase alternating current source coupled to three phase terminals 38 of the machine control console 14. To enable the above described controls to selectively actuate, deactuate and reverse the table drive motor 19, the terminals A3, B3, and C3 of motor 19 connect to terminals 38 through the contacts of a reversing relay 39. Relay 39 may be of the form having an off position at which motor 19 is disconnected from power supply terminals 38, a forward drive position at which the motor terminals A3, B3, and C3 are connected to individual ones of the terminals 38 and a reverse drive position at which such terminals are again connected to terminals 38 but with the phase supplied to terminals A3 and B3 being reversed from that of the forward drive position. To provide for actuation and deactuation of the first spindle drive motor 28A, the three terminals A1, B1 and C1 thereof connect with power supply terminals 38 through separate contacts of a first power relay 41A and for similar purposes the three terminals A2, B2 and C2 of the second spindle motor 28B connect with power terminals 38 through separate contacts of a second power relay 41B.

A suitable circuit 40 through which the several controls 31 to 37 operate the relays 39, 41A and 41B to accomplish the desired machine functions in the course of a work cycle is known to the art and accordingly is not herein described. However, of interest relative to the present invention is the fact that each control 31 to 37 necessarily includes some form of switching means, represented by switch symbols 31' to 37' in FIG. 1 which closes to electrically energize an associated individual output conductor 31'' to 37'' respectively to circuit 40 when the particular control is actuated. In order to connect the work cycle monitor 42 of the present invention with such a machine tool 11, an individual one of a series of signal conductors 43 to 48 is connected to individual ones of conductors 31'' to 37'' respectively to obtain signals indicative of actuation of each of the several controls. Controls 31 through 37 may typically operate from a single phase of the three phase power supply 13 and the conductors 49 and 50 which supply this power are extended to the work cycle monitor 42. Additional signals which are transmitted to monitor 42 to accomplish the objectives of the invention include signals indicative of changes in power consumption by the spindle drive motors 28A and 28B. For this purpose, a pair of current signal conductors 51 and 52 connect with opposite ends of a transformer secondary winding 53 which forms a transformer utilizing the conductor 54 between one terminal 38 and one terminal A1 of motor 28A as a primary winding. As it is desired to sense changes in power rather than current alone, an additional pair of conductors 55 and 55'' are connected between motor terminals A1 and B1 and monitor 42 to transmit voltage signals thereto, power being the product of current multiplied by voltage. Similarly, a pair of conductors 56 and 57 connect with opposite ends of an additional transformer secondary winding 58 encircling one of the conductors between power supply terminal 38 and terminal A2 of second spindle motor 28B to produce a signal indicative of the current drawn by the second spindle motor and a pair of voltage signal conductors 60 and 60' extend to monitor 42 from motor terminals A2 and B2 respectively.

Accordingly, the work cycle monitor 42 receives electrical signals over input conductors 43, 44, 45, 46, 47, 48 respectively indicative of energization of the machine controls to Feed Right, Return Right, Right Spindle On, Feed Left, Return Left and Left Spindle On and further receives a signal over conductors 51 and 52 indicative of current being drawn by the first spindle motor 28A together with a signal on conductors 55 and 55' indicative of voltage thereat. Monitor 42 further receives an additional signal over input conductors 56 and 57 indicative of the current being drawn by the second spindle motor 28B and a signal on conductors 60 and 60' indicative of voltage thereat.

As will hereinafter be described in more detail, monitor 42 utilizes these signals to display a count indicative of the total number of normal work cycles performed at milling machine 11 and further prepares a printed record of the number of each such work cycle together with the day and time of completion thereof.

For these purposes, the monitor 42 includes a digital readout device 61 for displaying the accumulated work cycle count and a digital clock 62 for displaying the day, month, hour and minute together with a printer 63 for recording the time and number of each complete work cycle. Preferably, these data display and recording means are included in a single printer counter device 64, such devices being known to the art. Additional data indicating devices, visible at the surface of monitor 42, include four indicator lamps L1, L2, L3 and L4, the functions of which will be hereinafter described.

Figure 2:
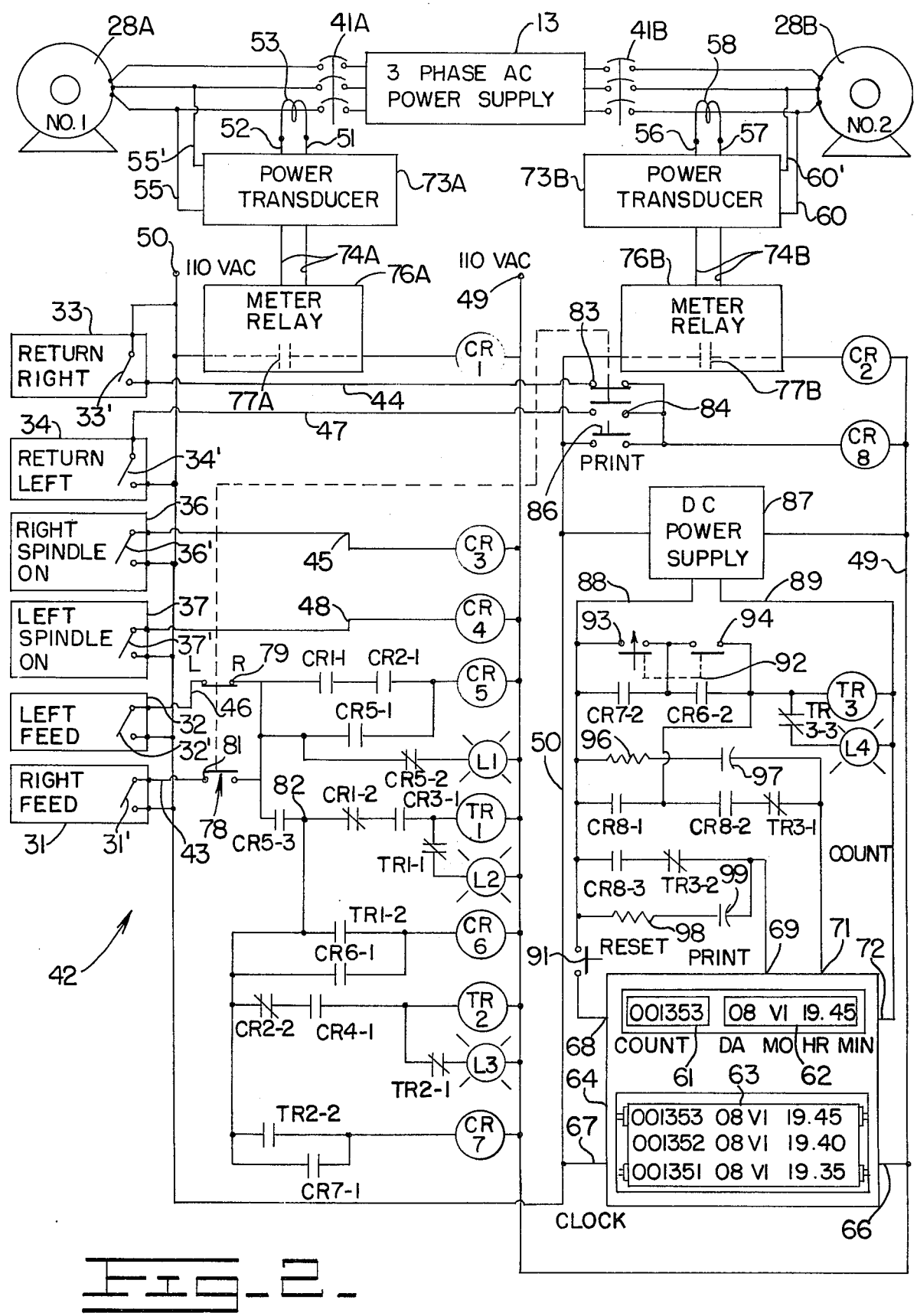
FIG. 2 is a schematic circuit diagram of a first embodiment of the present invention which provides a permanent printed record of the time of completion of each individual workpiece in the system of FIG. 1 in addition to a total count thereof.

Considering now the internal circuit of the monitor 42, reference should be made to FIG. 2. Printer counter 64 has AC power terminals 66 and 67 connected to AC power conductors 49 and 50, respectively, to supply operating power to the several components referred to above and further has three DC input signal terminals including a reset terminal 68 energization of which resets the accumulated count to zero, a print terminal 69 energization of which initiates printing of a count number and time at printer 63, a count terminal 71 for receiving the count signal indicative of each full work cycle and a DC return terminal 72. The other elements of the monitor 42 function basically to transmit a DC count signal to terminal 71 and a print signal to terminal 69 for each complete normal work cycle.

The conductors 51 and 52 from first transformer secondary winding 53 and associated voltage signal conductors 55 and 55' connect with a first power transducer 73A of the known form which produces a DC voltage across a pair of output conductors 74A wherein the DC voltage has a magnitude proportional to the AC power represented by the current and voltage signals applied to the input. Similarly, the second power sensing transformer winding 58 and associated voltage conductors 60 and 60' are connected to a second power transducer 73B of similar form. The DC output signal from power transducer 73A is transmitted to a meter relay 76A having internal contacts 77A connected between AC power conductors 49 and 50 in series with a main relay driver coil CR1. Similarly, the output of power transducer 73B is connected to a second meter relay 76B having internal contacts 77B connected between the AC power conductors 49 and 50 in series with a second main relay driver coil CR2. Both meter relays 76 may be of the known form wherein the internal contacts 77 are technically normally open but functionally normally closed in that the contacts close when the meter input is first energized and then reopen only when the DC voltage applied to the meter relay rises to a predetermined level known as the set point. Accordingly, main relay driver coils CR1 and CR2 are energized while spindle motors 28 are only lightly loaded and are subsequently deenergized when the power consumption at the spindle motors 28A and 28B, respectively, reaches a predetermined magnitude. This responsiveness to power changes rather than to current changes as such is an important advantage of the present invention. Power is essentially the product of voltage and current and thus undergoes a greater absolute change than current alone in response to a change of loading on the motors 28 and sensitivity of the system to small changes in motor loading is thereby enhanced. Further, in AC circuits, current changes may not precisely match changes in motor loading because of phase and power factor considerations whereas the true power consumption of the motor must of necessity change in strict accordance with variations in loading.

In order to distinguish between normal complete work cycles and defective cycles or attempts at false cycling, additional means are provided for analyzing the signals received from the machine controls on the several conductors 43 to 48. These include a relay driver coil CR3 connected between the AC conductors 49 and 50 in series with the switch means 36' of the Right Spindle On control and a relay driver coil CR4 connected across the AC conductors in series with switch means 37' of the Left Spindle On control. A two position manual switch 78 has a first set of contacts 79 connected across the AC conductors in series with switch 32' of the Feed Left control and in series with normally open relay contacts CR-1, normally open relay contacts CR2-1 and an additional relay driver coil CR5. Contacts CR1-1 are closed by energization of driver coil CR1 while contacts CR2-1 are closed by energization of driver coil CR2, Switch 78 has an additional set of contacts 81 connected across the AC power conductors in series with switch means 31' of the Feed Right control and in series with the previously described contacts CR1-1, CR2-1 and driver coil CR5. Thus switch 78 may be set to a Feed Left position at which the first contacts 79 are closed while the second contacts 81 are open and to a Feed Right position at which the contacts settings are reversed in order to adjust the system to the mode of operation at the milling machine. To provide a hold circuit for driver coil CR5, an additional set of relay contacts CR5-1, which are closed by energization of driver coil CR5, are connected in parallel with contacts CR1-1 and CR2-1. To provide a visual indication of the receipt and utilization of the feed signal at the beginning of a work cycle, a first indicator lamp L1 is connected between both sets of contacts of switch 78 and power conductor 49 through a normally closed set of relay contacts CR5-2 which are opened by the energization of driver coil CR5.

To suppress response of the monitor 42 to power increases of less than a predetermined duration characteristic of a normal work cycle, a time delay relay driver coil TR1 is connected between both sets of contacts of manual switch 78 and power conductor 49 in series with a set of normally open relay contacts CR5-3, a set of normally closed relay contacts CR1-2 and an additional set of normally open relay contacts CR3-1. Time delay relay driver coil TR1 is of the form which operates in response to applied energization only after a predetermined time period which in this instance is selected to be the minimum time of increased loading of spindle drive motor 28A in a normal work cycle. To provide a visual indication if coil TR1 has failed to operate, a second indicator lamp L2 is connected across coil TR1 in series with normally closed relay contacts TR1-1 which are opened by the operation of TR1.

To also time the duration of power rise at the second spindle motor 28B to assure that a complete work cycle has occurred, a second time delay relay driver coil TR2 is connected between power conductor 49 and a junction point 82 between contacts CR5-3 and CR1-2 in series with normally open contacts CR4-1 and normally closed contacts CR2-2, the driver coil TR2 having a time delay period corresponding to the minimum duration of power rise at second spindle motor 28B in the course of a normal work cycle. To indicate if TR2 has failed to operate in the course of a work cycle, an additional indicator lamp L3 and set of normally closed relay contacts TR2-1 are connected in parallel with coil TR2. Another relay driver coil CR6 is connected between power conductor 49 and terminal 82 through a set of normally open contacts TR1-2 and also through a set of normally open contacts CR6-1. Still another relay driver coil CR7 is connected between power conductor 49 and terminal 82 through a set of normally open relay contacts TR2-2 and also through a set of normally open relay contacts CR7-1.

To automatically initiate a printout of each complete work cycle, the previously described switch 78 has an additional set of contacts 83 which, at the Feed Left position of the switch, operates to close a circuit from power conductor 49 through a relay driver coil CR8 and switch means 33' of Return Right control 33 to power conductor 50. At the Feed Right position of switch 78, an additional set of contacts 84 thereof close a circuit from power conductor 49 through driver coil CR8 to power conductor 50 through switch means 34' of Return Left control 34. To provide a means for manually initiating a printout of the existing work cycle count and time, a normally open manual print switch 86 is connected between power conductors 49 and 50 in series with driver coil CR8.

As previously discussed, the signal inputs 68, 69 and 71 of this particular printer counter 64 require DC signals and for this purpose a DC power supply 87 is connected between AC power conductors 49 and 50 and has positive and negative DC output conductors 88 and 89 respectively. Positive conductor 88 connects to the reset signal input terminal 68 of the printer counter 64 through a normally open manually operable reset switch 91 and negative conductor 89 connects to the DC return terminal 72.

This embodiment of the monitor 42 is adapted to be set to monitor a variety of work cycles including cycles which involve only loading of the first spindle drive motor 28A of cycles involving only loading of the second spindle motor 28B or cycles in which both motors may be utilized. To adapt the monitor 42 to any one of these types of cycles, a manually operated cycle matching switch 92 has a first set of contacts 93 and a second set of contacts 94 with both sets of contacts being connected in series across DC power conductors 88 and 89 in series with a third time delay relay driver coil TR3. Switch 92 has three positions including a first position at which contacts 93 are closed while contacts 94 are open, a second position at which a reversed setting of these contacts is made and a third position at which both of these sets of contacts are opened. Time delay relay driver coil TR3 is also connected between DC conductors 88 and 89 in series with two sets of normally open relay contacts CR7–2 and CR6–2 with the junction between these two sets of relay contacts being electrically connected to the junction between contacts sets 93 and 94 of switch 92. Switch contacts 93 and 94 thus provide a means for selectively bypassing either of relay contacts CR7–2 and CR6–2 from the energization circuit of coil TR3.

To provide a visual indication if relay driver coil TR3 has failed to operate during a work cycle or remains operated, a fourth indicator lamp L4 is connected thereacross in series with a set of normally closed relay contacts TR3–3 which are open by energization of the coil TR3. Normally open relay contacts CR8–1 and two additional sets of normally closed relay contacts CR8–2 and TR3–1 are connected in series between DC power conductor 88 and count signal input terminal 71 of printer counter 64, with the junction between contacts CR8–1 and CR8–2 being connected to the junction between contacts CR6–2 and relay driver coil TR3. To suppress voltage transients, a resistor 96 and capacitor 97 are connected in series between DC power conductor 88 and printer counter input terminal 71 in parallel with relay contacts CR8–1, CR8–2 and TR3–1.

To provide print signals to the printer counter 64, normally open relay contacts CR8–3 and normally closed contacts TR3–2, are connected between DC power conductor 88 and print signal input terminal 69 in parallel with a resistor 98 and capacitor 99 which serve to suppress voltage transients in the print signal channel.

Operation of the circuit of FIG. 2 will be described with reference to the monitoring of work cycles of the type in which switch 78 is set to the Feed Left position and switch 93 is set to the position at which both sets of contacts 93 and 94 thereof are opened in order to count only cycles involving power consumption rises at both of the spindle motors 28A and 28B.

As spindle motors 28 are initially only lightly loaded, the output signals from power transducers 73 are below the set points of meter relays 76 and thus the contacts 77 of both meter relays are closed and main relay drivers CR1 and CR2 are energized. With both spindle motors 28 on, relay drivers CR3 and CR4 are also energized. Accordingly, at this initial stage of the work cycle, relay contacts CR1–1 are closed and contacts CR1–2 are opened while contacts CR2–1 are closed and CR2–2 are open. Contacts CR3–1 and CR4–1 are closed and all other relay contacts temporarily remain in the normal conditions depicted in FIG. 2.

Counting of a work cycle is initiated, subject to required conditions being met, when one of the feed controls 31 or 32 is actuated depending on the position of switch 78, actuation of the Feed Left control 32 being required in the particular work cycle herein being discussed for purposes of example. As relay contacts CR1–1 and CR2–1 are closed, actuation of Feed Left control 32 energizes relay driver coil CR5, causing contacts CR5–1 to close, thereby latching the drive coil CR5 on without regard to subsequent opening of contacts CR1–1 or CR2–1. This also opens contacts CR5–2 to turn off indicator lamp L1 and contacts CR5–3 are closed to provide electrical power at terminal point 82.

Provided the work cycle proceeds in the normal manner, the loading on both spindle drive motors 28 then increases to the point where the outputs of power transducers 73 operate meter relays 76 causing the meter relay contacts 77 to open and thereby deenergize main relay driver coils CR1 and CR2. This recloses contacts CR1–2 energizing time delay relay driver coil TR1 and lamp L2. The simultaneous reopening of contacts CR1–1 does not deenergize driver coil CR5 as the holding contacts CR5–1 remain closed. Similarly, the deenergization of coil CR2 recloses contacts CR2–2 thereby energizing the other time delay coil TR2 and lamp L3. Contacts CR2–1 also reopen but relay driver coil CR5 remains energized for the reasons discussed above.

The application of energization to time delay relay driver coil TR1 begins a predetermined timing period, equal to the minimum time needed to complete the necessary cutting operations driven by spindle motor 28A, after which TR1 opens relay contacts TR1–1 to deenergize indicator lamp L2 and closes contacts TR1–2 to energize relay driver coil CR6. Similarly, application of energization to the other time delay relay driver coil TR2 begins a timing period equal to the minimum length of the required cutting operation driven by second spindle drive motor 28B after which TR2 opens contacts TR2–1 to deenergize indicator lamp L3 and closes contacts TR2–2 to energize relay driver coil CR7.

Energization of driver coil CR6 closes contact CR6–1 to latch the driver coil CR6 in the energized condition while operation of driver coil CR7 closes contacts CR7–1 to similarly latch driver coil CR7 in the energized condition. Energization of coils CR6 and CR7 also closes contacts CR6–2 and CR7–2 to apply energization to the DC time delay relay driver coil TR3 and light indicator lamp L4. In this connection it should be observed that the cycle matching switch 92 enables contacts CR7–2 to be bypassed if the work cycle does not include operation of spindle motor 28B and enables contacts CR6–2 to be bypassed if spindle motor 28A is not included in the work cycle, both sets of contacts 93 and 94 of switch 92 being in the open condition where both spindle motors are utilized in the course of the work cycle.

The closing of contacts CR7–2 and CR6–2, or one of the other thereof if the switch 92 is set for a single spindle cycle, applies DC energization to count signal input 71 of printer counter 64 through contacts CR8–2 and TR3–1. Accordingly, an additional workpiece count is added to the total displayed at readout 61. The count signal is terminated by operation of time delay relay driver coil TR3 which opens contacts TR3–1 to break the circuit to the count signal input terminal 71. Operation of coil TR3 also opens contacts TR3–3 to turn off indicator lamp L4.

At this stage, cutting operations are complete and the loading on spindle motors 28 has decreased to the point that contacts 77A and 77B of meter relays 76 reclose and thereby reenergize relay driver coils CR1 and CR2. Contacts CR1–1 and CR2–1 are thereby closed while contacts CR1–2 and CR2–2 are opened. Also at this time, switch means 32'of Feed Left control 32 opens to remove energization from driver coils TR1, TR2 CR5, CR6 and CR7. This opens relay contacts CR6–1, CR6–2 and CR7–1 and CR7–2 which in turn deenergizes time delay relay TR3 of the DC circuit.

At this stage of the work cycle, switch 33'of the Return Right control 33 is closed causing energization of relay driver CR8 through switch contacts 83. This closes contacts CR8–1 to reenergize time delay relay driver coil TR3 and indicator lamp L4 and also closes contacts CR8–3 to transmit a print pulse to terminal 69 of printer counter 64 while opening contacts CR8–2 to prevent transmission of another count signal to terminal 71 of the printer counter. Accordingly, printer 63 records the new workpiece number together with the day and time of completion thereof. The operator may also initiate printout of the current workpiece total and time, at any time, by momentarily closing manual switch 86 but this does not generate an additional count signal at terminal 71 as such action opens contacts CR8–2 blocking transmission of count signals to the printer-counter.

Following the expiration of the delay time of time delay relay driver coil TR3, the coil TR3 operates and opens contacts TR3–2 thereby terminating the print signal applied to printer counter terminal 69 and also opens contacts TR3–3 turning off indicator lamp L4. Switch means 33'of Return Right control 33 opens after the work table has restored to the initial position thereby deenergizing relay driver CR8 which in turn opens contacts CR8–1 to deenergize time delay relay driver TR3. This restores the system to the condition which existed at the start of the work cycle which has now been recorded as an additional workpiece count at visual readout 61 and at printer 63. Upon commencement of the next work cycle of the milling machine, the above described sequence of circuit operations is repeated.

From the foregoing, it may be seen that a workpiece count is not displayed or recorded at printer counter 64 unless electrical power consumption at both spindle motors 28 rises above predetermined values and remains above these values for periods which are characteristic of a normal work cycle. If either increase of power consumption is not of a predetermined magnitude and duration, then at least one of the time delay relays TR1 and TR2 will reset and fail to energize at least one of relay driver coils CR6 and CR7. Consequently, the open condition of one or both of contacts CR6–2 and CR7–2 will prevent transmission of a count signal to terminal 71 of the printer counter. Further, should any of the critical relays fail to operate, that condition is made apparent by the several indicator lamps.

If it is not desired to produce a printed record of each count, including the time of completion thereof as in the embodiment described above, the monitor circuit may be considerably simplified. An example of such a simplified circuit is shown in FIG. 3 wherein the data display device is simply a visual digital readout counter 61'which displays a cumulative count of signals applied across AC signal input terminals 101 and 102 and which has a reset terminal 103 which may be energized to restore the display count to zero, suitable detailed constructions for counters of this form being well known to the art. In the monitor circuit 42'of FIG. 3, power transducers 73, meter relays 76, relay driver coils CR1 to CR7, TR1, TR2, and lamps L1 to L3 may all be similar to the corresponding elements of the first embodiment and accordingly will not be redescribed. Similarly, the interconnections between the foregoing elements and relay contacts CR1–1, CR1–2, CR2–1, CR2–2, CR3–1, CR4–1, CR5–1, CR5–2, CR5–3, CR7–1, TR1–1, TR1–2, TR2–1, TR2–2 may all be similar to the corresponding elements of the first embodiment and will not be redescribed except that it should be observed that the switch 78' which is operated to adjust to the direction of workpiece feed may be of a simplier form as this embodiment does not require the Return Right and Return Left signals employed for certain described purposes in the first embodiment.

In this embodiment, the previously described relay driver coil CR8 and energizing means therefor and the DC power supply and all components operated from the output thereof are absent. A time delay relay 104 corresponding to relay driver coil TR3 of the previous embodiment is included but is AC operated in this instance and is connected across AC conductors 49'and 50'in series with the contacts 93'and 94'of the cycle matching switch 92'which is functionally similar to switch 92 of the first embodiment, as previously described. Thus, in this embodiment, relay contacts sets CR7–2 and CR6–2 are connected in parallel with the contacts 93'and 94'of switch 92', with the junction between the two sets of relay contacts being connected to the junction between the two sets of switch contacts. Similarly, as in the previous embodiment, normally closed relay contacts TR3–1 are connected across driver coil 104 in series with indicator lamp L4, the contacts TR3–1 being opened by operation of coil 104. The count signal input terminal 101 of visual readout 61' is then connected to the junction point 106 between relay contacts TR3–1 and indicator lamp L4.

Operation of the circuit of FIG. 3 is similar to that of the previously described embodiment up to the point where relay driver coils CR6 and CR7 are energized in response to uninterrupted cutting operations of a normal duration. Upon energization of these two driver coils CR6 and CR7, energization is applied to driver coil 104 through either or both of relay contacts CR7–2 and CR6–2 depending on the setting of switch 92' and this also transmits a count signal to readout 61' and energizes lamp L4. After a predetermined brief time interval, time delay driver coil 104 operates and opens contacts TR3–1 to terminate the count signal to readout 61' and to deenergize lamp L4. At this stage, the loading on spindle motors 28A' and 28B' has decreased causing driver coils CR1 and CR2 to be energized by closing of the contacts 77 of meter relays 76A and 76B. This closes relay contacts CR1–1 and CR2–1 while opening contacts CR1–2 and CR2–2. As the table drive motor or feed signal received through switch 78' is also terminated at the completion of the work cycle, each of driver coils CR5, CR6, CR7, TR1, TR2, are deenergized, and this in turn opens relay contacts CR6–1, CR6–2, CR7–2, CR7––1. This removes energization from time delay relay driver coil 104 thereby restoring the circuit to the initial condition in preparation for counting of a subsequent cycle of operation of the milling machine.

While the invention has been described with respect to certain preferred embodiments, it will be apparent that many modifications are possible and it is not intended to limit the invention except as defined in the following claims.

What is claimed is:

1. A system for counting work cycles at an electrically powered device comprising:
   conductor means for supplying electrical energy to said device,
   electrical power detection means coupled to said conductor means through an inductive coupling to receive a current signal therefrom and also connected to said conductor means through a conductive connection thereto to receive a voltage signal therefrom for producing an output signal indicative of the product of current and voltage in said conductor means and thus indicative of the amount of power being consumed by said device,
   a counter having an input for receiving count signals and having means for indicating a cumulative total of count signals received,
   count signal producing means coupled between said power detection means and said counter for transmitting a count signal to said counter in response to each repetition of a predetermined pattern of power consumption variation at said device, wherein said count signal producing means responds to rises of power consumption above a predetermined value and has a first time delay means for preventing transmission of a count signal to said counter in response to a rise of power consumption at said device unless power consumption remains above said predetermined value for a predetermined period.

2. The combination defined in claim 1 wherein said count signal producing means has an additional time delay device for terminating each count signal applied to said counter a predetermined time after initiating of each count signal, and further comprising indicator means for indicating operation of said first and second time delay means.

3. A system for counting work cycles at an electrically powered device comprising:
   conductor means for supplying electrical energy to said device,
   electrical power detection means coupled to said conductor means through an inductive coupling to receive a current signal therefrom and also connected to said conductor means through a conductive connection thereto to receive a voltage signal therefrom for producing an output signal indicative of the product of current and voltage in said conductor means and thus indicative of the amount of power being consumed by said device,
   a counter having an input for receiving count signals and having means for indicating a cumulative total of count signals received,
   count signal producing means coupled between said power detection means and said counter for transmitting a count signal to said counter in response to each repetition of a predetermined pattern of power consumption variation at said device, wherein said count signal producing means comprises a meter relay coupled to said power detection means, and means for initiating production of a count signal in response to a rise of said output signal of said power detection means above a predetermined value, and
   a time delay device energized by said meter relay in response to said power rise,
   switching means controlled by said time delay device for transmitting said count signal to said counter a predetermined time after said time delay device is energized, and
   means operated by said meter relay for resetting said time delay device to prevent transmission of a count signal to said counter if said output signal of said power detection means decreases below said predetermined value prior to completion of the time delay period of said time delay device.

4. A system for counting work cycles at an electrically powered device comprising:
   conductor means for supplying electrical energy to said device,
   electrical power detection means coupled to said conductor means through an inductive coupling to receive a current signal therefrom and also connected to said conductor means through a conductive connection thereto to receive a voltage signal therefrom for producing an output signal indicative of the product of current and voltage in said conductor means and thus indicative of the amount of power being consumed by said device,
   a counter having an input for receiving count signals and having means for indicating a cumulative total of count signals received,
   count signal producing means coupled between said power detection means and said counter for transmitting a count signal to said counter in response to each repetition of a predetermined pattern of power consumption variation at said device,
   wherein said electrically operated device has a plurality of electrical motors each of which is operated in the course of each work cycle and has a plurality of said conductor means each supplying electrical energy to an individual one of said motors, wherein said system has a plurality of said power detection means each coupled to a separate one of said conductor means to produce an output signal indicative of power consumption variations at an individual one of said motors, and wherein said count signal producing means includes a plurality of switching devices, means for transmitting count signals to said counter only in response to operation of each of said plurality of switching devices, and means for operating each of said switching devices in response to a predetermined increase of power consumption at a specific individual one of said motors.

5. The combination defined in claim 4 further comprising a plurality of time delay means for delaying operation of each individual one of said switching devices for a predetermined period after sensing of a power rise at the individual one of said motors by the individual one of said power detection means associated with each one of said switching devices.

6. The combination defined in claim 5 further comprising manually operated switch means connected in parallel with individual ones of said switching devices for selectively bypassing individual ones of said switching devices in order to adapt said system to operations which do not require loading of all of said motors.

* * * * *